(12) United States Patent  
Dwyer

(10) Patent No.: US 6,625,537 B2
(45) Date of Patent: Sep. 23, 2003

(54) METHODS AND APPARATUS FOR ASSEMBLING A FLIGHT PLAN

(75) Inventor: David B. Dwyer, Scottsdale, AZ (US)

(73) Assignee: Honeywell, Morristown, NJ (US)

(*) Notice: Subject to any disclaimer, the term of this patent is extended or adjusted under 35 U.S.C. 154(b) by 0 days.

(21) Appl. No.: 10/056,756

(22) Filed: Jan. 23, 2002

(65) Prior Publication Data

US 2003/0139877 A1 Jul. 24, 2003

(51) Int. Cl.[7] .............................................. G01C 21/00
(52) U.S. Cl. ....................................................... 701/206
(58) Field of Search .................................. 701/202, 206, 701/207, 208, 211, 212; 434/47; 342/63

(56) References Cited

U.S. PATENT DOCUMENTS 6,314,370 B1 * 11/2001 Curtright ..................... 701/213
6,449,556 B1 * 9/2002 Pauly ........................... 701/206

* cited by examiner

Primary Examiner—Yonel Beaulieu

(57) ABSTRACT

Method and apparatus are provided for assembling a flight plan. The apparatus has a memory configured to store data associated with waypoints that can be used in the flight plan and a processor that is configured to access the memory and retrieve the data associated with a first waypoint and data associated with a second waypoint. The first waypoint corresponding to a first leg of the flight plan and the second waypoint corresponding to a second leg of the flight plan. In addition, the apparatus has a display that is configured to produce a visual representation of the flight plan with a single waypoint designation at a single location for the first waypoint and the second waypoint using the data retrieved by the processor. The display is also configured to produce a Graphical User Interface (GUI) for the single waypoint designation at the single location with a first leg identifier for the first leg and a second leg identifier other than first leg identifier for the second leg.

29 Claims, 3 Drawing Sheets

US 6,625,537 B2

METHODS AND APPARATUS FOR ASSEMBLING A FLIGHT PLAN

TECHNICAL FIELD

The present invention generally relates to flight planning, and more particularly to methods and apparatus for assembling a flight plan.

BACKGROUND OF THE INVENTION

Flight planning systems are currently in wide scale use for commuter, long range, wide body jet airlines, and other types of aircraft. Flight planning systems have continued to advance in sophistication and have also continued to provide increasingly higher levels of information density that enable the visual presentation of a greater amount of data to the operator and/or user. These advancements in sophistication and the increasingly higher levels of information density provide the visual display of data that can be readily assimilated by an operator and/or user and also provides a reduction in unnecessary information to ease the task of perceiving and understanding data of interest for flight plan assembly tasks.

Flight plan assembly or flight planning includes, but is not limited to, a review of a lateral map on a display, such as a Multi-Function Display (MFD), and assembly of multiple flight routes to form the flight plan. The flight plan can be automatically assembled from a database having a pre-defined route/city pair or manually assembled by an operator and/or user. The resulting flight plan is generally composed of active and alternate flight plans specified with one or more waypoints, which are uniquely identified latitude and longitude points. The waypoints are assembled to create a route of flight that comprises departures, enroutes, arrivals, and approaches, for example.

A significant amount of flexibility is generally provided for generating an initial flight plan and for modifying the waypoints of an existing flight plan. For example, an operator can generally insert a waypoint, delete a waypoint, and overfly a waypoint. In addition, departure/arrival procedures, airway intersections, offsets, and holding patterns can be inserted into a flight plan. However, this tends to produce multiple waypoints at a single location on the lateral map with a single set of data associated with each of the waypoints displayed for review by the operator and/or user. Therefore, it is desirable to visually present the waypoints in a manner that provides proper cognitive mapping between the operator and/or user and also preferably reduces the effort that the operator and/or user needs to make to distinguish between the multiple waypoints at the single location on the lateral map.

In view of the foregoing, it should be appreciated that it would be desirable to provide methods and apparatus for assembling a flight plan that present the waypoints in a manner that provides proper cognitive mapping between the operator and/or user and also preferably reduces the effort that the operator and/or user needs to make to distinguish between the multiple waypoints at the single location on the lateral map. Furthermore, additional desirable features will become apparent to one of ordinary skill in the art from the foregoing background of the invention and following summary, brief description of the drawings, detailed description of the drawings, and appended claims.

SUMMARY OF THE INVENTION

In accordance with the teachings of the present invention, methods and apparatus are provided for assembling a flight plan. The apparatus has a memory configured to store data associated with waypoints that can be used in the flight plan and a processor coupled to the memory, which is configured to access the memory and retrieve data associated with a first waypoint and data associated with a second waypoint. The first waypoint corresponding to a first leg of the flight plan and the second waypoint corresponding to a second leg of the flight plan. In addition, the apparatus has a display coupled to the processor. The display is configured to produce a visual representation of the flight plan with a single waypoint designation at a single location for the first waypoint and the second waypoint using the data retrieved by the processor. The display is also configured to produce a Graphical User Interface (GUI) for the single waypoint designation at the single location with a first leg identifier for the first leg and a second leg identifier other than first leg identifier for the second leg.

The method includes the steps of storing data in a memory that is associated with waypoints for planning of a flight plan, retrieving the data from the memory that is associated with a first waypoint and a second waypoint of the waypoints. The first waypoint corresponding to a first leg of the flight plan and the second waypoint corresponding to a second leg of the flight plan. In addition, the method includes generating a visual representation of the flight plan with a single waypoint designation at a single location for the first waypoint and the second waypoint using the data retrieved from the memory and generating a Graphical User Interface (GUI) for the single waypoint designation at the single location with a first leg identifier for the first leg and a second leg identifier other than the first leg identifier for the second leg.

BRIEF DESCRIPTION OF THE DRAWINGS

The present invention will hereinafter be described in conjunction with the appended drawing figures, wherein like numerals denote like elements, and.

DETAILED DESCRIPTION OF THE DRAWINGS

The following detailed description of the drawings is exemplary in nature and is not intended to limit the invention or the application or use of the invention. Furthermore, there is no intention to be bound by any theory presented in this detailed description of the drawings.

Figure 1:
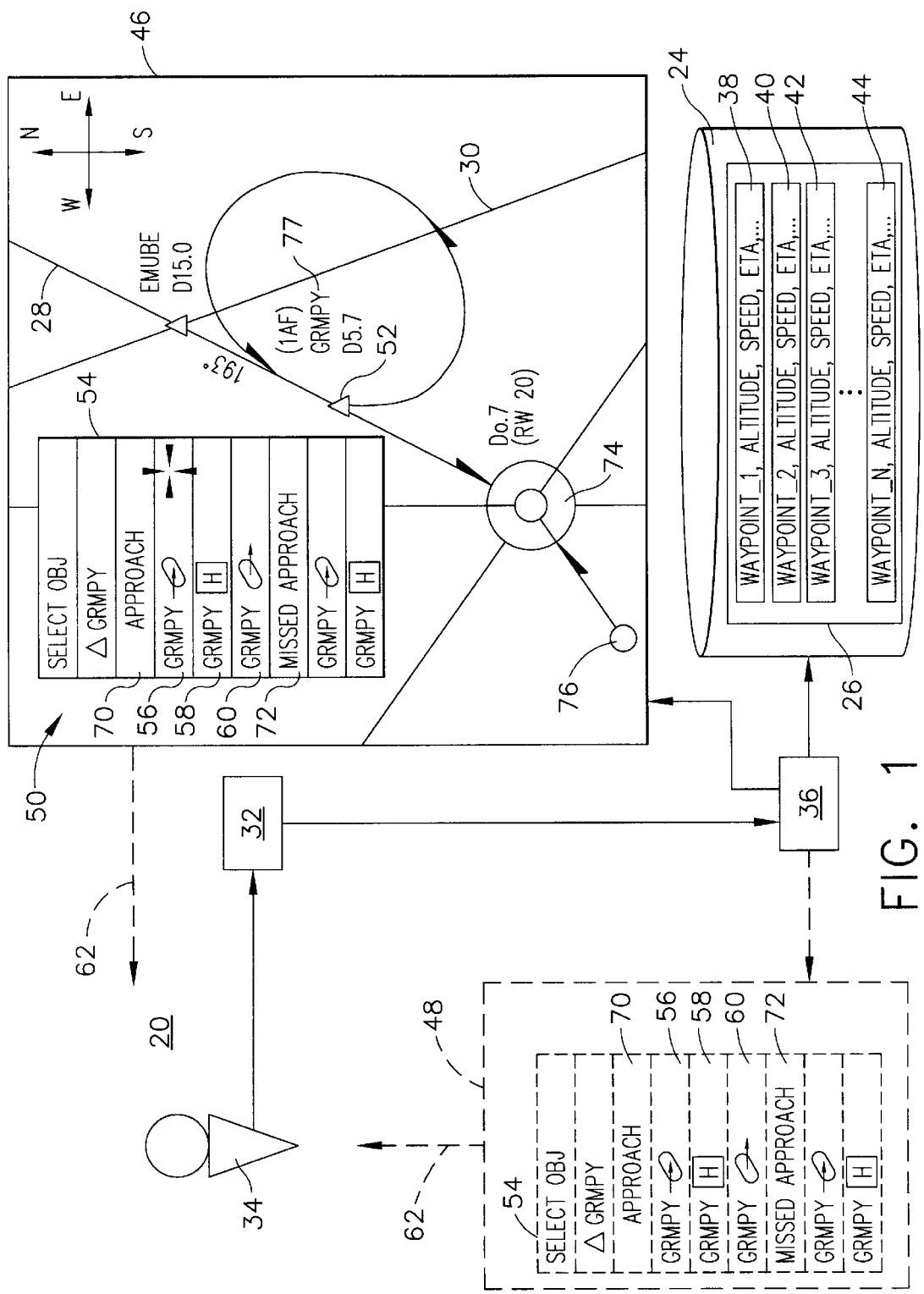
FIG. 1 is a an apparatus for assembling a flight plan according to a preferred exemplary embodiment of the present invention.

Referring to FIG. 1, an apparatus 20 is illustrated for assembling a flight plan (i.e., course of traveling for an aircraft) according to a preferred exemplary embodiment of the present invention. The apparatus 20 can be a stand-alone system, integrated with another system, and/or can be a stand-alone system configured to communicate with another system. In addition, the apparatus 20 can be configured for assembling a flight plan for any number of aircraft in any number of applications. For example, the apparatus 20 can integrated with a flight simulator or flight software entertainment package or a Flight Management System (FMS), and can be configured for assembling a flight plan of a commuter, long range, wide body jet airplane, and other types of aircraft.

The apparatus 20 comprises a memory 24 that is configured to store data 26 associated with multiple waypoints that can be used in assembling a single flight route such as a first flight route 28, or multiple flight routes such as the first flight route 28 and a second flight route 30. The data 26 can be any information associated with a waypoint, which as used herein is a uniquely identified latitude and longitude location/point. For example, the information associated with a waypoint can include, but is not limited to altitude, velocity, latitude/longitude, estimated time or arrival (ETA), distance to go (DTG), estimated time enroute (ETE), fuel remaining at the waypoint, and predicted altitude crossing, for example. However, the data 26 can include other information and any amount of information associated with one or more waypoints that are stored in the memory 24 for assembling the single route or the multiple routes of the flight plan. The data 26 can be originally stored in the memory 24 and subsequently updated with any number of memory storage and memory updating techniques know to one of ordinary skill in the art. Alternatively, the data 26 can be manually entered into the memory 24 with an input device 32, which can be any device suitable for accepting input from an operator and/or user (hereinafter collectively referred to as "operator") 34 of the apparatus 20, such as a touch-pad, joystick, mouse, trackball, alpha keypad, numeric keypad, alphanumeric keypad, for example.

In addition to the memory 24, the apparatus 20 also comprises a processor 36 that is coupled to the memory 24, which encompasses one or more functional blocks and can include any number of individual microprocessors, memories, storage devices, interface cards, and other processor components. The processor 36 is configured to access the data 26 in the memory 24 and also configured to at least selectively retrieve data associated with a first waypoint 38 and data associated with a second waypoint 40. In addition, the processor 36 can be configured to retrieve data associated with more waypoints than the data associated with the first waypoint 38 and the data associated with second waypoint 40, such as the data associated with the third waypoint 42 and other data associated with other waypoints (i.e., data associated with the Nth waypoint, where N is greater than three (3) 44).

According to a preferred exemplary embodiment of the present invention, the first waypoint corresponds to a first leg of a first flight phase and the second waypoint corresponds to a second leg of the first flight phase. The first leg, second leg, and any other legs can be any number of legs in a flight plan as well known by one of ordinary skill in the art, such as an in-bound leg, hold pattern leg or outbound leg of the first flight phase and any other flight phase can be any number of flight phases such as a primary flight plan, alternate flight plan, approach or missed approach, for example. However, the flight phases can be any number of activities and stages of a flight plan and the legs of the flight plan can be any number of activities and stages.

In addition to the processor 36 and the memory 24, the apparatus 20 of the present invention comprises a display 46 coupled to the processor 36. Alternatively, and according to an alternate embodiment of the present invention, the apparatus 20 can comprise a second display 48 that is coupled to the processor 36 in addition to the display 46. The display 46 and second display 48 can be any current and future display that is suitable for producing a visual representation of the flight plan 50. The display 46 and second display 48 are preferably a color display and more preferably a multi-color display. For example, the display 46 and/or second display 48 can be a color Cathode Ray Tube display (CRT), monochrome CRT display, Liquid Crystal Display (LCD), plasma display, Flat-Panel Display (FPD), electro-luminescent display, vacuum fluorescent display, Heads-Up Display (HUD), Heads-Down Display (HDD), Helmet Mounted Display (HMD), Light Emitting Diode (LED) display or the like.

The display 46 is configured to produce the visual representation of the flight plan 50 with a single waypoint designation 52 for at least the data associated with the first waypoint 38 and the data associated with the second waypoint 40. However, the single waypoint designation 52 can be visually represented for any number of waypoints according to the present invention.

The display 46 is also configured to produce a Graphical User Interface (GUI) 54 with at least a first leg identifier 56 for the first leg and a second leg identifier 58 for the second leg other than the first leg identifier 56 (i.e., the second leg identifier 58 is different than the first leg identifier 56). The display 46 is preferably configured to produce the GUI 54 with a greater number of leg identifiers other than the first leg identifier 56 and the second leg identifier 58, such as the third leg identifier 60 for a third leg other than the first leg identifier 56 and the second leg identifier 58 (i.e., the third leg identifier 60 is different than the first leg identifier 56 and the second leg identifier 58). Alternatively, and in accordance with another embodiment of the present invention, the display 46 can be configured to produce the visual representation of the flight plan 50 with the single waypoint designation 52 for at least the data associated with the first waypoint 38 and the data associated with second waypoint 40 and the second display 48 can be configured to produce the GUI 54 as previously described in this detailed description of the drawings.

The operator 34 (e.g., an aircraft pilot and/or aircraft navigator) preferably provides input to the processor 36 with the input device 32 to select the single waypoint designation 52 and receives visual feedback 62 from the GUI 54 generated on the display 46 and/or the second display 48 of the waypoints represented by the signal waypoint designation 52. This allows the waypoints associated with the single waypoint designation 52 to be displayed in a manner that provides proper cognitive mapping between the operator and also preferably reduces the effort that the operator needs to make to distinguish between the multiple waypoints at the single location on the lateral map.

Figure 2:
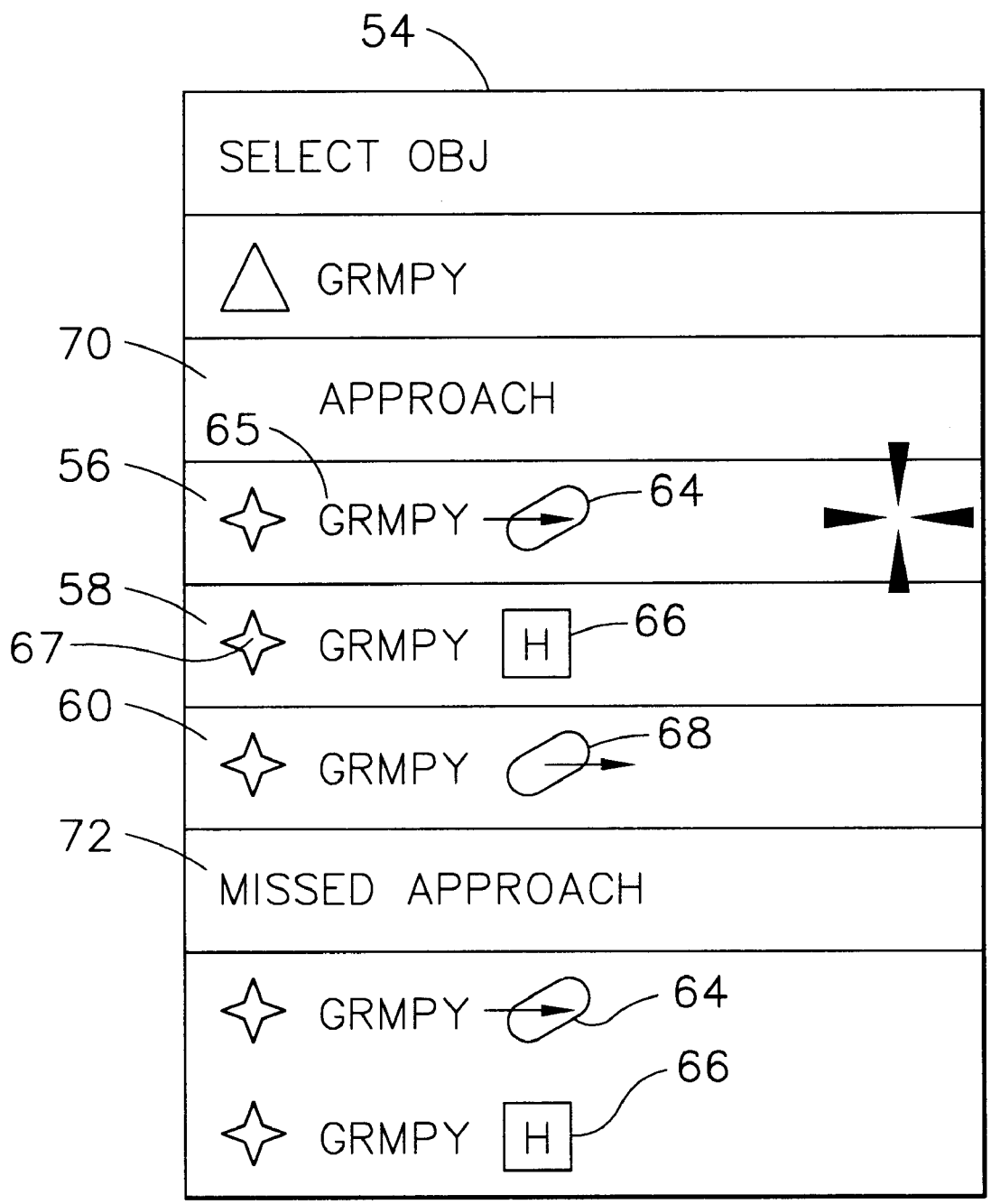
FIG. 2 is the Graphical User Interface (GUI) of FIG. 1 according to a first preferred exemplary embodiment of the present invention.

Referring to FIG. 2, the GUI 54 of FIG. 1 is illustrated according to a first exemplary embodiment of the present invention, which allows the waypoints associated with the single waypoint designation to be displayed in a manner that provides proper cognitive mapping between the operator and also preferably reduces the effort that the operator needs to make to distinguish between the multiple waypoints at the single location on the lateral map. In accordance with the first preferred exemplary embodiment of the present invention, the first leg identifier 56 comprises a first symbol 64, the second leg identifier 58 comprises a second symbol 66, and the third identifier 60 comprises a third symbol 68. More preferably, the first leg identifier 56, second leg identifier 58 and/or third leg identifier 60 also comprise a unique waypoint identifier 65 and even more preferably comprise a waypoint symbol 67. Furthermore, a first flight phase identifier 70 and a second flight phase identifier 72 are utilized to identify the flight phases associated with the leg identifiers (56, 58,60). For example, an "approach" textual label is used as the first flight phase identifier 70 for the first flight phase of the GRMPY waypoint and a "missed approach" textual label is used for the second flight phase identifier 72 of the GRMPY waypoint. However, it should be understood that this is merely an example. In this way, the fight phase identifiers (70,72) provide the phase of flight and the leg identifiers (56,58,60) distinguish between the legs of the of flight phases.

With momentary reference to FIG. 1 in conjunction with reference to FIG. 2, which as previously discussed is presented merely as an example, an aircraft approach into a first location 74 is visually represented and the GUI 54 of FIG. 2 is provided to the operator 34 upon selection of the single waypoint designation 52. In this illustration, the aircraft is approaching from the south-east via a first transition 76. The first flight route 28 has the aircraft fly from the first transition 76 to the first location 74 and then outbound to the single waypoint designation 52 having a unique waypoint identifier of GRMPY 77. If GRMPY is selected by the operator 34 utilizing the input device 32, the GUTI 52 is displayed to the pilot on the display 46 and/or the second display 48. In this example, there are five waypoint occurrences represented by the single waypoint designation 52. The flight phase identifiers (70,72) are used to indicate phase of flight and the leg identifiers (56,58,60) having the symbols (64,66,68) are used to indicate the leg of flight for a flight phase. The first leg identifier 56 with the first symbol 64 in flight phase 70 is the inbound leg to the hold at the GRMPY waypoint. The second leg identifier 58 with the second symbol 66 is the hold at the GRMPY waypoint, and the third leg identifier 60 with the third symbol 68 is the flight plan leg outbound from GRMPY.

According to one embodiment of the present invention, after selection of one of the leg identifiers (56,58,60) within a flight phase (70,72), a second GUI (not shown) is displayed that presents a flight planning task menu. This second GUI presents to the operator 34 the flight planning actions that can be performed on the uniquely named waypoint. The flight planning tasks may vary depending on the type of the selected waypoint. For example, if GRMPY is selected with a hold already on the waypoint, the flight planning task menu could present an option for deletion of the hold. Other occurrences of GRMPY would not present this option if a hold does not exist on the waypoint.

Figure 3:
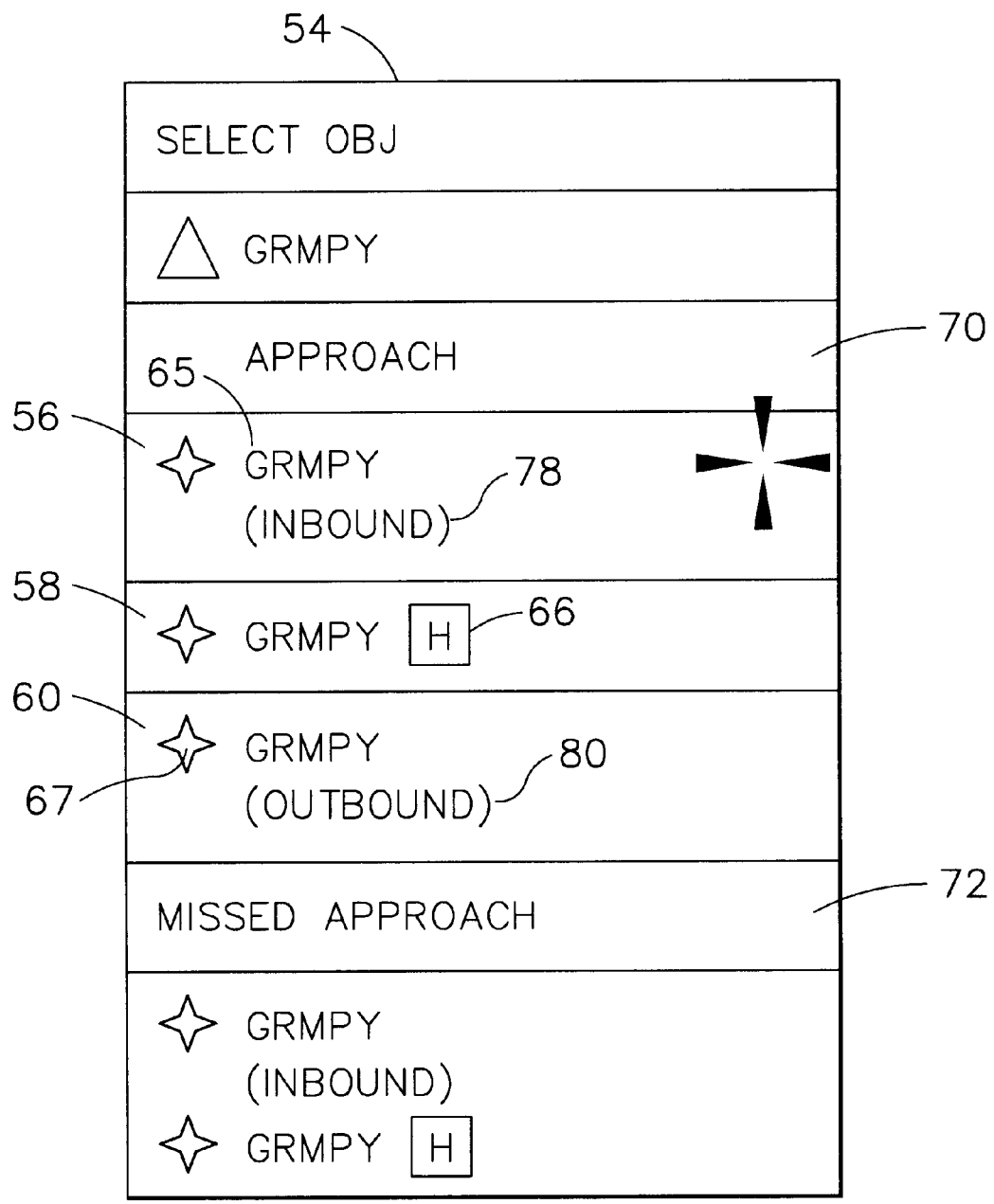
FIG. 3 is the GUI of FIG. 1 according to a second preferred exemplary embodiment of the present invention.

Referring to FIG. 3, the GUI 54 of FIG. 1 is illustrated according to a second preferred exemplary embodiment of the present invention. In this second preferred exemplary embodiment, the first leg identifier 56 comprises first text 78 (e.g., "INBOUND"), the second leg identifier 58 comprises the second symbol 66, and the third leg identifier 60 comprises a second text 80 (e.g., "OUTBOUND"). Furthermore, a first flight phase identifier 70 and a second flight phase identifier 72 are preferably utilized to identify the flight phases associated with the leg identifiers (56,58,60). More preferably, the unique waypoint identifier 65 is used in conjunction with the leg identifiers (56,58,60) and the waypoint symbol 67 is also preferably used in conjunction with the unique waypoint identifier 65. However, it should be understood that any number of flight phases with any number of legs can be included on the GUI according to the present invention and other symbols, icons, text, numerics, alphanumerics, and the like, and combinations there of, can be used as the flight phase identities and the leg identifiers, the unique waypoint identifier and the waypoint symbol to provide proper cognitive mapping between the operator and also preferably reduce the effort that the operator needs to make to distinguish between the multiple waypoints at the single location on the lateral map.

From the foregoing description, it should be appreciated that methods and apparatus are provided for assembling a flight plan that present significant benefits, which have been presented in the background of the invention, summary, brief description of the drawings, and detailed description of the drawings and also present significant benefits that would be apparent to one or ordinary skill in the art. Furthermore, while a preferred exemplary embodiment has been presented in the foregoing detailed description of the drawings, it should be appreciated that a vast number of variations in the embodiments exist. Lastly, it should be appreciated that these embodiments are preferred exemplary embodiments only, and are not intended to limit the scope, applicability, or configuration of the invention in any way. Rather, the foregoing detailed description provides those skilled in the art with a convenient road map for implementing a preferred exemplary embodiment of the invention. It being understood that various changes may be made in the function and arrangement of elements described in this detailed description of the drawings without departing from the spirit and scope of the invention as set forth in the appended claims.

What is claimed is:

1. An apparatus for assembling a flight plan, comprising:
   a memory configured to store data associated with a plurality of waypoints of the flight plan;
   a processor coupled to said memory, said processor configured to access said memory and retrieve data associated with a first waypoint and data associated with a second waypoint of said plurality of waypoints, said first waypoint corresponding to a first leg of the flight plan and said second waypoint corresponding to a second leg of the flight plan; and
   a display coupled to said processor, said display configured to produce a visual representation of the flight plan with a single waypoint designation at a single location for said first waypoint and said second waypoint using said data retrieved by said processor, said display further configured to produce a Graphical User Interface (GUI) for said single waypoint designation at said single location with a first leg identifier for said first leg and a second leg identifier other than said first leg identifier for said second leg.

2. The apparatus for assembling the flight plan of claim 1, wherein said processor is configured to access said memory and retrieve data associated with a third waypoint of said plurality of waypoints, said third waypoint corresponding to a third leg of the flight plan.

3. The apparatus for assembling the flight plan of claim 2, wherein said display is configured to produce said visual representation of the flight plan with said single waypoint designation at said single location for said first waypoint, said second waypoint, and said third waypoint using said data retrieved by said processor.

4. The apparatus for assembling the flight plan of claim 3, wherein said display is configured to produce said GUI for said single waypoint designation at said single location with a third leg identifier for said third leg other than said first leg identifier and said second leg identifier.

5. The apparatus for assembling the flight plan of claim 2, wherein said first leg identifier comprises a first symbol and said second leg identifier comprises a second symbol.

6. The apparatus for assembling the flight plan of claim 5, wherein said first leg identifier further comprises a unique waypoint identifier and said second leg identifier further comprises said unique waypoint identifier.

7. The apparatus for assembling the flight plan of claim 6, wherein said first leg identifier further comprises a waypoint symbol and said second leg identifier further comprises said waypoint symbol.

8. The apparatus for assembling the flight plan of claim 1, wherein said display is configured to produce said GUI for said single waypoint designation at said single location with a first flight phase identifier, said first flight phase identifier identifying said first leg identifier with a first flight phase of the flight plan.

9. The apparatus for assembling the flight plan of claim 8, wherein said first flight phase identifier identifies said second leg identifier with said first flight phase of the flight plan.

10. The apparatus for assembling the flight plan of claim 8, wherein said display is configured to produce said GUI for said single waypoint designation at said single location with a second flight phase identifier, said second flight phase identifier identifying said second leg identifier with a second flight phase of the flight plan.

11. An apparatus for assembling a flight plan, comprising:
a memory configured to store data associated with a plurality of waypoints of the flight plan;
a processor coupled to said memory, said processor configured to access said memory and retrieve data associated with a first waypoint and data associated with a second waypoint of said plurality of waypoints, said first waypoint corresponding to a first leg of the flight plan and said second waypoint corresponding to a second leg of the flight plan;
a display coupled to said processor, said display configured to produce a visual representation of the flight plan with a single waypoint designation at a single location for said first waypoint and said second waypoint using said data retrieved by said processor; and
a second display coupled to said processor, said second display configured to produce a Graphical User Interface (GUI) for said single waypoint designation at said single location with a first leg identifier for said first leg and a second leg identifier other than first leg identifier for said second leg.

12. The apparatus for assembling the flight plan of claim 11, wherein said processor is configured to access said memory and retrieve data associated with a third waypoint of said plurality of waypoints, said third waypoint corresponding to a third leg of the flight plan.

13. The apparatus for assembling the flight plan of claim 12, wherein said display is configured to produce said visual representation of the flight plan with said single waypoint designation at said single location for said first waypoint, said second waypoint, and said third waypoint with said data associated with said first waypoint, said data associated with said second waypoint, and said data associated with said third waypoint.

14. The apparatus for assembling the flight plan of claim 13, wherein said second display is configured to produce said GUI with a third leg identifier for said third leg other than said first leg identifier and said second leg identifier.

15. The apparatus for assembling the flight plan of claim 12, wherein said first leg identifier comprises a first symbol and said second leg identifier comprises a second symbol.

16. The apparatus for assembling the flight plan of claim 15, wherein said first leg identifier further comprises a unique waypoint identifier and said second leg identifier further comprises said unique waypoint identifier.

17. The apparatus for assembling the flight plan of claim 16, wherein said first leg identifier further comprises a waypoint symbol and said second leg identifier further comprises said waypoint symbol.

18. The apparatus for assembling the flight plan of claim 11, wherein said second display is configured to produce said GUI with a first flight phase identifier, said first flight phase identifier identifying said first leg identifier with a first flight phase of the flight plan.

19. The apparatus for assembling the flight plan of claim 11, wherein said first flight phase identifier identifies said second leg identifier with a first flight phase of the flight plan.

20. The apparatus for assembling the flight plan of claim 18, wherein said second display is configured to produce said GUI with a second flight phase identifier, said second flight phase identifier identifying said third leg identifier with a second flight phase of the flight plan.

21. A method for assembling a flight plan, comprising:
storing data in a memory that is associated with a plurality of waypoints for planning of a flight plan;
retrieving said data from said memory that is associated with a first waypoint and a second waypoint of said plurality of waypoints, said first waypoint corresponding to a first leg of the flight plan and said second waypoint corresponding to a second leg of the flight plan; and
generating a visual representation of the flight plan with a single waypoint designation at a single location for said first waypoint and said second waypoint using said data retrieved from said memory; and
generating a Graphical User Interface (GUI) for said single waypoint designation at said single location with a first leg identifier for said first leg and a second leg identifier other than first leg identifier for said second leg.

22. The method for assembling the flight plan of claim 21, further comprising retrieving said data from said memory that Is associated with a third waypoint of said plurality of waypoints, said third waypoint corresponding to a third leg of the flight plan.

23. The method for assembling the flight plan of claim 22, further comprising generating said visual representation of the flight plan with said single waypoint designation at said single location for said first waypoint, said second waypoint, and said third waypoint.

24. The method for assembling the flight plan of claim 23, further comprising generating said GUI for said single waypoint designation at said single location with a third leg identifier for said third leg other than said first leg identifier and said second leg identifier.

25. The method for assembling the flight plan claim 22, further comprising retrieving said data from said memory that is associated with a fourth waypoint, said fourth waypoint corresponding to a fourth leg of the flight plan.

26. The method for assembling the flight plan claim 25, further comprising generating said visual representation of the fight plan with said single waypoint designation at said single location for said first waypoint, said second waypoint, said third waypoint, and said fourth waypoint.

27. The method for assembling the flight plan of claim 21, further comprising generating said GUI for said single waypoint designation at said single location with a first flight phase identifier, said first flight phase identifier identifying said first leg identifier with a first flight phase of the flight plan.

28. The method for assembling the flight plan of claim 27, wherein said first flight phase identifier identifies said second leg identifier with said first flight phase of the flight plan.

29. The method for assembling the flight plan of claim 21, further comprising generating said GUI for said single waypoint designation at said single location with a second flight phase identifier, said second flight phase identifier identifying a third leg identifier with a second flight phase of the flight plan.

* * * * *